United States Patent [19]
Goel

[11] 3,896,665
[45] July 29, 1975

[54] RAILWAY INSPECTION METHOD AND VEHICLE

[75] Inventor: Pierre Goel, Lausanne, Switzerland
[73] Assignee: Canron Inc., Phillipsburg, N.J.
[22] Filed: Sept. 15, 1972
[21] Appl. No.: 289,457

Related U.S. Application Data

[63] Continuation-in-part of Ser. No. 44,701, June 9, 1970, abandoned.

[52] U.S. Cl. ................................................. 73/146
[51] Int. Cl. ........................................... E01c 23/01
[58] Field of Search ............................. 73/146, 67.8

[56] References Cited
UNITED STATES PATENTS
3,517,307  6/1970  Wallen, Jr. et al. ................. 33/144

Primary Examiner—Donald O. Woodiel
Attorney, Agent, or Firm—Christopher Robinson

[57] ABSTRACT

Method and apparatus for inspecting the condition of a railroad track utilizing means able to continuously measure the geometrical characteristics of at least one line of rails of a railway track traversed, comprising feeler means in contact with the rails, said feeler means being at least in part displaceable perpendicularly to the longitudinal axis of the track, a measuring means being associated to at least one of said feeler means for measuring its displacement with respect to a reference means associated to said inspection vehicle, wherein in order to obtain an accurate measurement despite the uncertain contact of said feeler means with the rails, in particular during high speed travel, each said feeler means is associated with a non-contacting sensor means which is held in a fixed position relative to said feeler means and in the immediate proximity thereof for measuring an eventual variation between the feeler means and the rails, the results of the measurements made by said non-contacting sensor means providing a correction value for the measurement made by the feeler means.

5 Claims, 9 Drawing Figures

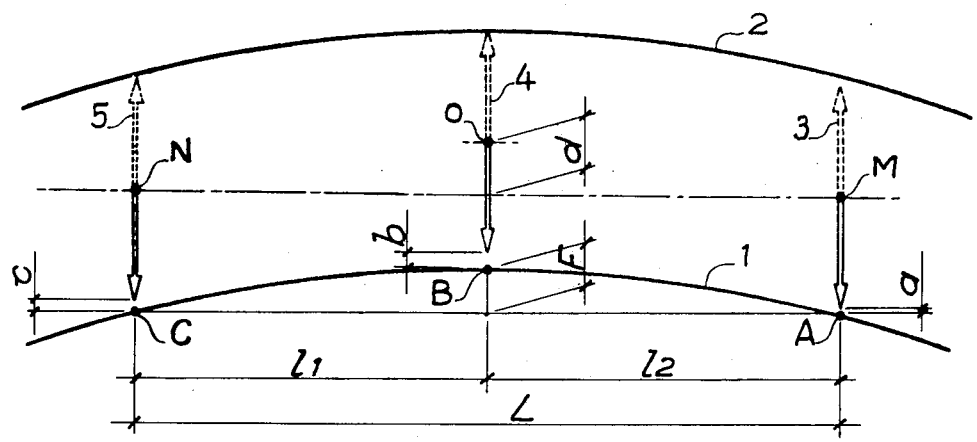
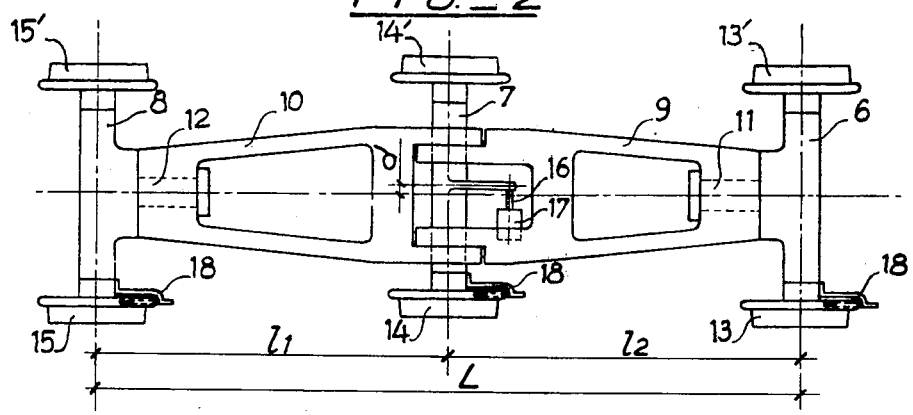
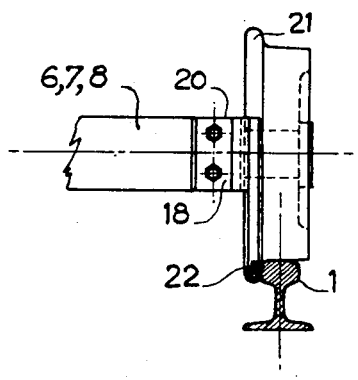
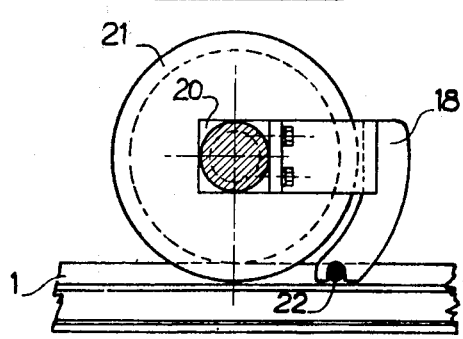

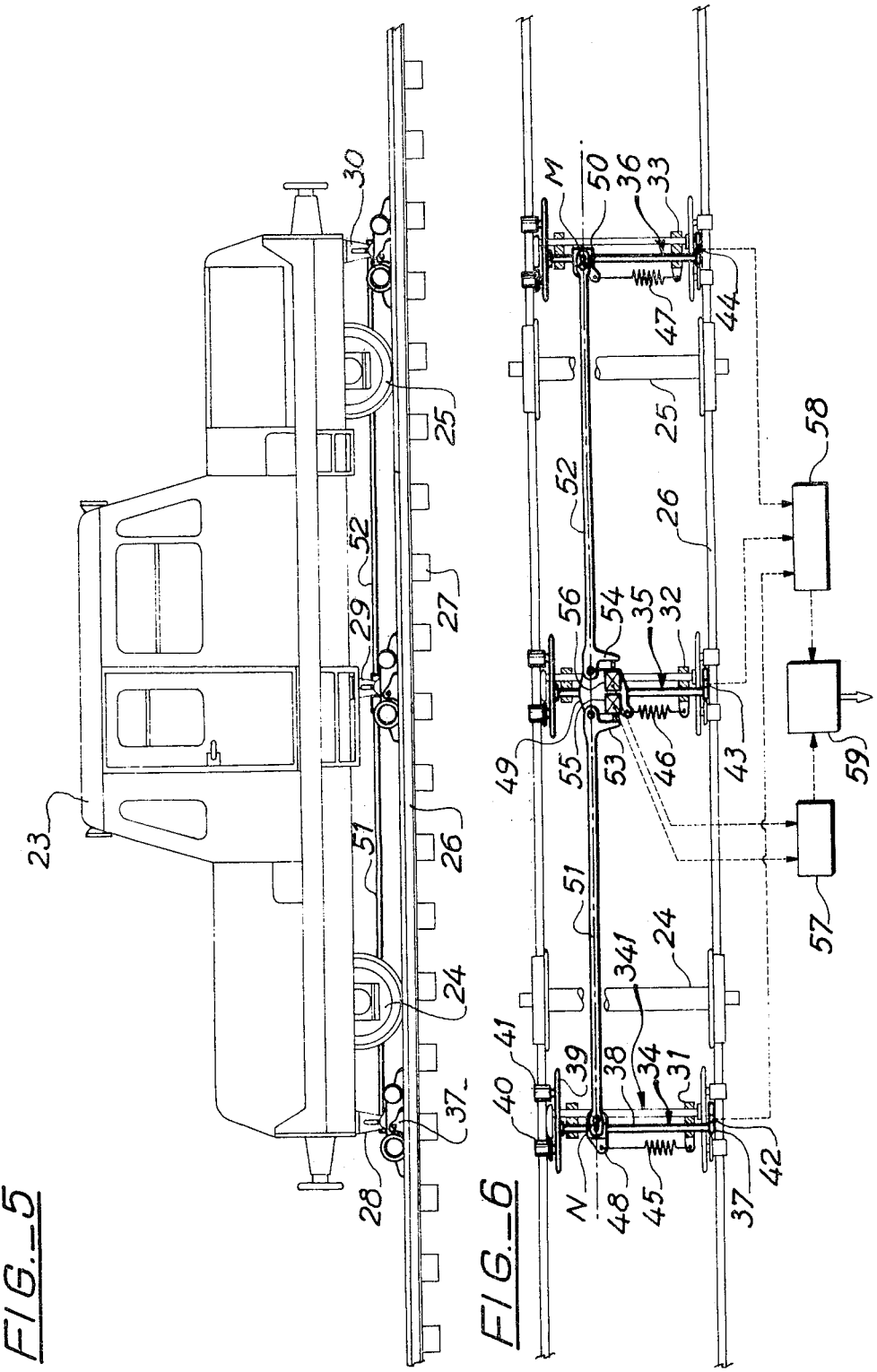

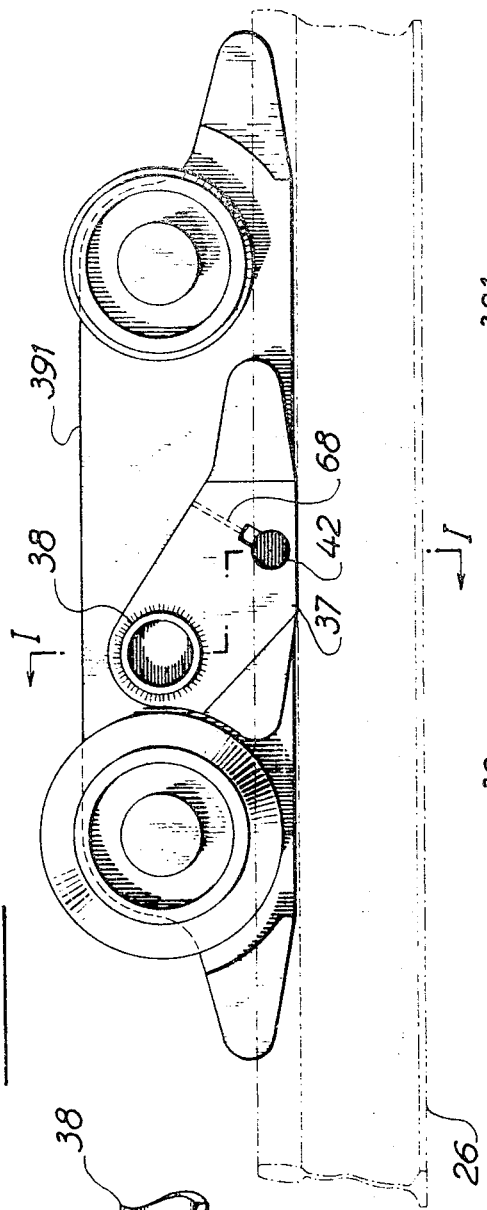
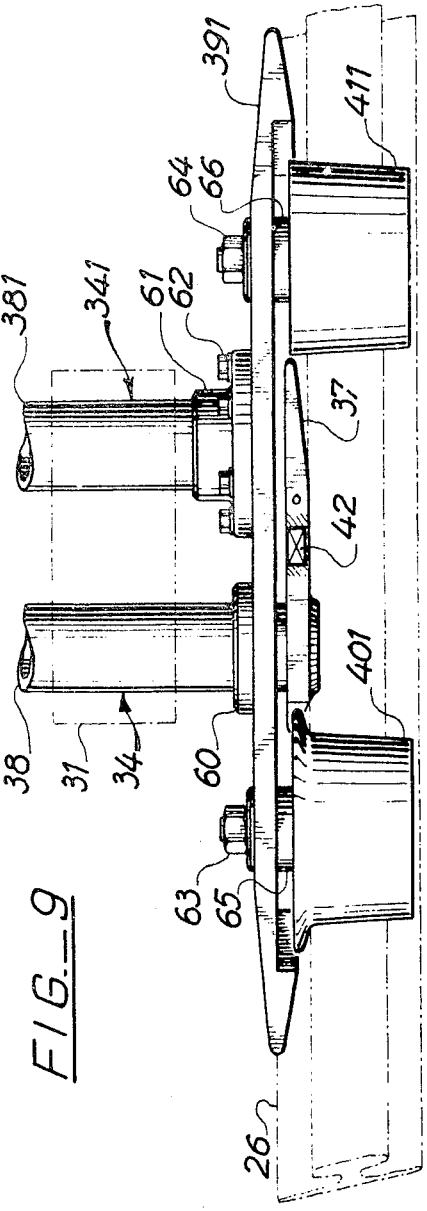
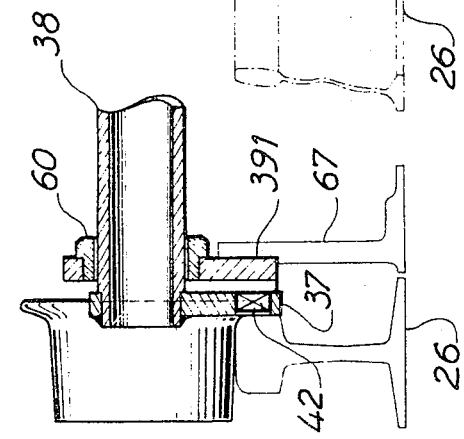

RAILWAY INSPECTION METHOD AND VEHICLE

This application is a continuation-in-part application of copending application Ser. No. 44,701, filed June 9, 1970, now abandoned in favor of a continuation application Ser. No. 275,060 filed July 25, 1972, now abandoned.

BACKGROUND OF THE INVENTION

DESCRIPTION OF THE PRIOR ART

The sensing of railway track is an operation performed with inspection vehicles equipped with means able continuously to measure the geometrical characteristics of the track traversed by the vehicle.

The conventionally used sensing means have feelers which are kept in contact with the rails of the track and which, via a transmission system, transmit their relative displacements or displacements relative to a reference means, to a recording device.

At present some of the transmission systems used are electrical, the displacement of a feeler being translated directly into an electrical displacement signal, for example by a sensor of the electrical transducer type.

However, despite all the improvements made thereto, this technique has the disadvantage that the movement of the sensing vehicle is limited to too slow a speed under present conditions; the permanent contact between the feelers and the rails cannot always be guaranteed at high speed due to the inertia of these feelers, notably when traversing faults or undulations of large amplitude and short length which generate transverse accelerations at said feelers which may result in the loss of contact with the rails.

It has been proposed that these mechanical feelers which are maintained in contact with the rails be replaced by non-contact sensors which are pneumatic, electrical, etc. which, as a result of being fixed to the vehicle chassis or to a reference base of this vehicle in immediate proximity to the rails would permit the direct obtaining, in the form of a signal, of the measurement of the variation between the chassis of the vehicle or the reference base and the rail of the track. However, the greatest distances which may be measured with these sensors are too small for making said sensors usable for measuring large deflections, more particularly in the short radius curves of railway track, and the measure of the deflections in curves is one of the essential operations in the inspection of the lining of railway tracks.

Hence, at the present time, if the geometry of a railway track has to be checked at high speed, there is a problem which cannot be solved via the known methods which make use either of detection means in contact with the rails which cannot guarantee the permanence of the accuracy of the measurements effected, or of detection means without any contact with the rails which do not satisfy to the requirements of the checking measure program to be effected.

SUMMARY OF THE INVENTION

The present invention offers a solution to this problem by providing a new measuring method permitting the use of the above indicated known means in a new combination which results in the suppression of the defects of said known means.

An object of the method according to the invention is to effect the measurement of the geometrical characteristics of at least one line of rails of a railway track during high speed travel thereover, characteristics such as the lining or the profile thereof, by making a measurement of the relative displacement of feeler means of a reference means, which feeler means are in contact with said line of rails. According to the invention, there is provided a measurement of the eventual variations between the rail and the feeler means which are in contact with said rail in order to obtain a correction value for the measurement of the relative displacement of the feeler means in contact with the rail, such a correction value being added to said measurement of the relative displacement of the feeler means in contact with the rail to correct the error existing eventually in said measurement due to the fact that the permanent contact between said feeler means and the rail cannot be guaranteed at high speed.

In this way, the method according to the invention permits to be certain to maintain the precision of the measurements effected and this, when the feeler means are in contact with the line of rails, in which case the correction equals zero, as well as when the contact between the feeler means and the rails is lost, in which case the error of the measurement due to such a loss of contact is corrected.

This method permits the rational use of non-contact sensors despite the fact that, as indicated above, these non-contact sensors can only measure accurately small distances, because in case of a loss of contact between the feeler means and the line of rails the eventual variations therebetween do not exceed the scope of measurement of these non-contact sensors.

The invention also provides a means by which the method of the invention may be carried out, such means comprising an inspection vehicle for measuring the geometrical characteristics of at least one line of rails of a railway track, comprising feeler means in contact with the rails, said feeler means being at least in part displaceable perpendicularly to the longitudinal axis of the track, a measuring means being associated to at least one of said feeler means for measuring its displacement with respect to a reference means associated to said inspection vehicle, wherein in order to obtain an accurate measurement despite the uncertain contact of said feeler means with the rails, in particular during high speed travel, each said feeler means is associated with a non-contacting sensor means which is held in a fixed position relative to said feeler means and in the immediate proximity thereof for measuring an eventual variation between the feeler means and the rails, the results of the measurements made by said non-contacting sensor means providing a correction value for the measurement made by the feeler means.

Within the general frame of the method according to the invention, there is also provided a method for measuring, during high speed travel thereover, the arc deflections in curves and the large faults of short length of at least one line of rails of a railway track, comprising the measurement of the relative displacement $d$ of the middle feeler means which is movable relative to a reference line defined by the position of the two outer feeler means of a reference means having three feeler means in contact with said line of rails and of which the permanent contact with said line of rails cannot be guaranteed because of their inertia, such method comprising the steps of:

measuring, by means of non-contacting sensor means in the immediate proximity of each of said three feeler means of said reference means the eventual respective variations, $a$, $b$ and $c$ between said feeler means and the rails, summing said values $a$, $b$, $c$ and $d$ according to the formula:

$$F = d + l(a1_1 + c2_2/L - b)$$

in which

F is the corrected value of the deflection or of the fault,

L is the distance between the outer feeler means of said three feeler means reference means, and $1_1$ and $1_2$ are respectively the distances between said middle feeler means and said outer feeler means.

The means descrived herein permit the method to be performed in its application to the measurement of deflections of rails in the plane transverse to the track, this application being non-limitative and given solely as an example.

DETAILED DESCRIPTION OF THE INVENTION

The description and drawings hereinafter show, by way of example, means for performing the method of this invention in the case where it is applied to the measurement of deflections of the rails in the plane transverse to the track.

FIG. 1 illustrates the principle of the method according to the mathematical formula which is given for the measurement of the deflection at any point of the arc substended by a given chord, in the case of a reference means having three feeler means.

FIG. 2 shows schematically a means for performing the method of the invention according to the principle of FIG. 1 and using the vehicle wheels themselves as feelers.

FIGS. 3 and 4 are details of the installation of a non-contact sensor on the inside of the flange of a vehicle wheel.

FIG. 5 is a side elevation view of an inspection vehicle according to the invention and comprising a reference means having feeler means with contact shoes provided with non-contacting sensors.

FIG. 6 is a top view of FIG. 5 which has been limited to show only the reference means.

FIGS. 7, 8 and 9 are respecttively side elevation and top views showing in detail the extremity of a shoe feeler of the reference means shown in FIGS. 5 and 6.

Referring to the drawings, FIG. 1 shows a curved section of railway track, the two lines 1 and 2 representing the rails thereof. The curvature has been deliberately exaggerated for clarity of drawing.

The three parallel arrows 3, 4 and 5 represent three feelers kept at constant distances $1_1$ and $1_2$ from one another, such three feelers forming part of the reference means of an inspection vehicle.

The deflection F of the line of rails 1, determined by the chord AC is measured by the displacement $d$ of a fixed point 0 of the central feeler 4 relative to a straight line joining two fixed points N and M of the outer feelers 3 and 5 respectively, when the three feelers are in contact with the line of rails 1.

In this case, $F = d$.

However, this is not the case in the figure where the feelers 3, 4 and 5 are shown respectively at distances $a$, $b$ and $c$ from the line of rails 1. The measurement of $d$ is therefore inaccurate and it is very likely that $d$ will not equal F.

A correction will then have to be made to the measurement of $d$, which correction will be a function of the variations, $a$, $b$ and $c$, which variations are measured complementarily by sensors or any other non-contacting measuring instrument, as indicated in the description of the means for performing the method of the invention.

In this case, if we assume:
$1_1 + 1_2 = L$ it is easy to show that:
$F = d + (a1_1 + c1_2/L - b)$
a formula which gives for the measurement of F a summation of two measurements:

one, $d$, being the measurement of the relative displacement of the feeler means in theoretical but uncertain contact with the rails, the other $(a1_1 + c1_2/L - b)$ being the correction value which is determined in function of the measurement of the possible variations $a$, $b$ and $c$ between the feeler means of the reference means and the rails of the track.

This formula, which is applicable to the measurement of deflections in the horizontal plane of the track, can also be used fo vertical deflections and can thus be used for checking track levelling.

FIG. 2 shows a means for measuring the deflections of a line of rails of a railway track according to the principle illustrated in FIG. 1 of the method of the invention.

This device uses the wheels of the inspection vehicle itself as feelers.

To this end three axles 6, 7 and 8 are mounted on a chassis in two parts 9 and 10 which are articulated longitudinally and without play on the central axle 7, the latter being able to move transversely to the longitudinal axis of the assembly, but not to rotate.

The two outer axles 6 and 8 are articulated transversely, 6 at 11 to the half-chassis 9 and 8 at 12 to the half-chassis 10.

At the ends of these axles are mounted wheels 13, 14 and 15 supported on one line of rails and wheels 13', 14' and 15' supported on the other line of rails.

This device forms a reference system, of which the wheels-feelers, depending on the undulations and faults of the track, cause the deformation of its geometry. This deformation can be measured, as here for example the transverse displacement $d$ of the central axle relative to the longitudinal axis of the chassis according to the diagram of FIG. 1, for measuring the deflections.

This displacement $d$ can be measured by an electrical sensor of the known transducer type with a differential transformer of which the plunger 16 is connected rigidly to the sliding axle 7 and the box 17 to one of the half-chassis, here 9.

At the ends of the axles 13, 14 and 15 are rigidly mounted supports 18, wherein are fixed at their lower extremity, located on the inside of the flange of these wheels, non-contact sensors such as for example capacitive electrical transducers of known configuration, located exactly opposite the rail area which is generally in contact with the wheel flange.

This arrangement is seen in FIGS. 3 and 4 where the support 18 is shown bolted to the square end 20 of an axle (6, 7 or 8).

This support via a first bend follows the outline of the wheel in order, via a second bend to be located vertically on the inside of its flange 21 to drop to the level of the inside of the head of the rail 1 to carry a sensor 22.

This sensor always fixed relative to the geometry of the feeler supplies an electrical signal corresponding to the variations $a, b, c$ according to the principle outlined in FIG. 1.

The means of the invention therefore permits the obtaining of four electrical signals, $a, b, c$ and $d$ which, appropriately treated in known manner, will permit the measurement of the deflection F according to the previously given formula:

$$F = d + (al_1 + cl_2/L - b)$$

The following example shows another favourable application of the invention to an inspection vehicle provided with a reference means comprising feeler means with contact shoes of known type which permit the easy transit of railway track gaps, such as intersections and switches.

FIG. 5 shows a control vehicle 23 having two axles 24 and 25 supported on the railway track of which a line of rails 26 and the sleepers 27 are visible. Only the two axles of this vehicle and the rails of the track have been shown in the top view of FIG. 6.

This vehicle comprises a reference means which is driven by and follows the movements of the vehicle along the track via three support members 28, 29 and 30 located on either side of the longitudinal axis of the vehicle, at the three feeler locations which correspond to the three parallel arrows 3, 4 and 5 shown in FIG. 1 in connection with the principle of the invention. In each of these support members are respectively mounted for vertical sliding bearings 31, 32 and 33, the section of which is shown in FIG. 6.

In these bearings, three double feelers are sliding transversely to the track for sensing both lines of rails. However, for clarifying the drawing and the relative description, only the reference means on the line of rails 26 will be described, the other being exactly similar and symmetrical with respect to the longitudinal axis of the track.

The three feelers 34, 35 and 36 of the line of rails 26 comprise each, as for example the feeler 34, a shoe 37 rigidly connected via a shaft 38 to a bracket 39 on which are mounted two rollers 40 and 41 which are supported on the other line of rails of the railway track; one oof these rollers, 40, comprises a guiding flange. Close to this feeler 34, there is shown the feeler 341 of the other line of rails which is exactly similar but disposed symmetrically.

Each of said feelers 34, 35 and 36 of line of rails 26 comprises rigidly fixed in a housing inside their shoes a non-contacting sensor, respectively 42, 43 and 44, which is held in a position facing the upper part of the internal surface of the rail head of line of rails 26. This feeler structure will be described in detail hereafter in FIGS. 7, 8 and 9.

Three tension springs 45, 46 and 47 respectively connected to the bearings 31, 32 and 33, are maintaining the three feelers against the line of rails 26 via plates 48, 49 and 50 to which they are connected at their other ends, which plates are respectively rigidly fixed to the shafts of the feelers 34, 35 and 36. The springs of the feelers of the other line of rails have not been shown to avoid needless complication of the drawing, the system being symmetrical.

On these plates are articulated two rods 51 and 52 which are connecting them two by two. These rods comprise each a finger 53, respectively 54, at their end which is articulated on plate 49 of the middle feeler 35. These two fingers are acting each on the plunger of an electrical sensor 55, respectively 56, which are each producing an electrical signal. These two sensors are adjusted in such a way that the sum of their two signals is proportional to the value $d$ (FIG. 1) of the transverse displacement of the middle feeler 35 with respect to the straight line M'N' (corresponding to line MN of FIG. 1) defined by the position of the two outer feelers 34 and 36.

These two sensors are connected to a summing device 57 for providing an output signal which is proportional to said value $d$ and which, as previously said in the description relating to FIG. 1, is the value of the deflection or alignment fault of line of rails 26 at the level of the middle feeler with respect to the chord or straight line joining the two contact points with the rails of the two outer feelers. In order to correct the errors which may occur due to the eventual loss of contact during high speed travel, the non-contacting sensors 42, 43 and 44 of the shoes of the three contact feelers 34, 35 and 36, are connected to a calculator 58 for transmitting thereto the three signals which are proportional to the variations $a, b, c$ (according to FIG. 1) which may eventually exist between said feelers and the line of rails 26. This calculator is processing the three signals according to the formula given hereinabove in function of the constants $l_1, l_2$ and L (according to FIG. 1) for giving the output correction signal $(al_1 + cl_2/L - b)$ which is directed towards a second summing device 59 receiving the signal $d$ from the first summing device 57 to which it is connected.

The output signal of said second summing device 59 is the signal F, which is the corrected value of the deflection or of the alignment fault $d$ provided by the reference device having three contact feelers 34, 35 and 36.

In order to facilitate the understanding of the structure of the contact feeler means and the non-contacting sensors of the reference device which has been described, there is shown in detail FIGS. 7, 8 and 9 one end of one of the double feelers 34–341.

FIGS. 7 is a view from the right according to section I—I of FIG. 8 and FIG. 9 is a top view of FIG. 8.

There is shown on these FIGS. the line of rails 26, the shoe 37, the non-contacting sensor 42 and the shaft 38 of the feeler 34 as well as the shaft, the bracket and the rollers of the feeler 341 which has been already shown in FIGS. 5 and 6.

The shoe 37 is welded at the end of shaft 38 which slides in a bearing 60 which is fixed to the bracket 391 of feeler 341. This shoe 37 cannot rotate around the axis of the shaft 38, the latter being rigidly connected at its other end to its bracket 39 which is supported on the other line of rails by its rollers 40 and 41, as shown in FIG. 6. Such other end of the feeler 34 is designed exactly as that of feeler 341 which is shown here in detail. The shaft 381 of this second feeler is welded on a seat 61 which is fixed by screws 62 on the bracket 391. On this bracket 391 are fixed by an assembly of bolt and nut 63 and 64 the shafts 65 and 66 of rollers 401 and 411. A functional play, which takes into account the railway gauge variations between the two lines of rails, is provided for between the shoe 37 of the feeler 34 and the bracket 391 of the feeler 341. In the same way, an adequate play is provided for between the bearings such as 31 and the seats such as 61 to permit the free transverse displacement of the three double feelers so that they can follow the undulations of the track, within the alignment as well as the curves thereof, independently of the wheel axles of the vehicle.

In order to facilitate the track gaps transit, the ends of the shoe 37 and of the bracket 391 are rounded and tapered. The advantage of this structure is the following: during the transit of a rail intersection, after a switch, where the support surface for the shoe of a feeler is interrupted, the shoe is retained laterally by the bracket of its other end which is then supported on the counter rail 67 (FIG. 7) of the other rail which serves to guide the wheels of the railway vehicles in these regions. In the same way, the overall thickness of the shoe 37 and the bracket 341 does not exceed the space existing between an open switch blade and the line of rails which is free during the transit of a switch and, as a result thereof this type of feeler does not need to be lifted up from the track.

The sensor 42, as shown in the drawings, is located inside the shoe 37 within a housing where it is kept immovable and wherefrom it is connected via a channel 68 to the calculator 58, as shown in FIG. 6. Such sensor 42 works as previously described, in cooperation with the shoe 37 of the feeler 34 of the line of rails 26.

It is apparent that any modification within the reach of the man of the art may be made on the described devices without departing from the scope of the method according to the invention. Hence, the feelers may be of any kind whatsoever, while the reference means may be used for measuring the levelling of one or both lines of rails and the sensors may be electrical or pneumatic. To summarize, the invention is applicable in all cases of the measurement of a geometrical characteristic of the track where a reference device equipped with feelers in contact with the rails presents the risk of a loss of contact between the feelers and the rail.

What I claim as my invention is:

1. A method for measuring, during high speed travel thereover, the arc deflections in curves and the large faults of short length of at least one line of rails of a railway track, during high speed travel thereover with an inspection vehicle mounted thereon comprising the steps of measuring the relative displacement $d$ of a middle feeler means movable relative to a reference line defined by the position of two outer feeler means of a reference means having three feeler means in contact with said line of rails and wherein permanent contact with said line of rails cannot be guaranteed because of their inertia, such method comprising the steps of:

measuring, by means of non-contacting sensor means in the immediate proximity of each of said three feeler means of said reference means, the eventual respective variations $a, b$ and $c$ between said feeler means and the rail, and thereafter calculating from said measurements the true geometrical characteristics of said track by summing said values $a, b, c$ and $d$ according to the formula $$F = d + (al_1 + cl_2/L - b)$$

wherein F is the corrected value of the deflection or of the fault, L is the distance between the outer feeler means of said three feeler means reference means, and $l_1$ and $l_2$ are respectively distances between said middle feeler means and said outer feeler means.

2. A track inspection vehicle for measuring the geometrical characteristics of at least one line of rails of a railway track, during high speed travel thereover with an inspection vehicle mounted thereon comprising feeler means on the vehicle in contact with the rails, said feeler means being at least in part displaceable perpendicularly to the longitudinal axis of the track, a measuring means mounted on said vehicle being associated with at least one of said feeler means for measuring its displacement with respect to a reference means associated with said inspection vehicle, wherein in order to obtain an accurate measurement despite the uncertain contact of said feeler means with the rails, in particular during high speed travel, each feeler means is associated with a non-contacting sensor means means which is held in a fixed position relative to said feeler means and in the immediate proximity thereof for measuring an eventual variation between the feeler means and the rails, the results of the measurements made by said non-contacting sensor means providing a correction value for the measurement made by the feeler means.

3. The vehicle of claim 2, comprising flanged wheels for rolling on the rails, said feeler means being said wheels, wherein the non-contacting sensor means are located on the inside of the flanges of said wheels.

4. The vehicle of claim 2, in which said feeler means comprise shoe means in contact with the rails, wherein the non-contacting sensor means are located in said shoe means.

5. A method for measuring and inspecting geometrical characteristics, such as the lining or profile, of at least one line of rails of a railway track during high speed travel thereover with an inspection vehicle mounted thereon comprising the steps of:

a. measuring the relative displacement of feeler means mounted on the vehicle in contact with said line of rails with respect to a reference means mounted on the vehicle;

b. measuring an eventual variation between the feeler means and the rails by non-contact sensor means held in a fixed position relative to said feeler means and in the immediate proximity thereof to obtain a correction value for the measurement made by the feeler means;

c. thereafter adding the correction value to said measurement of the relative displacement of the feeler means in contact with the rail to obtain a measurement of the true geometrical characteristics of said track.

* * * * *